(12) United States Patent
Gregory et al.

(10) Patent No.: US 7,963,171 B2
(45) Date of Patent: Jun. 21, 2011

(54) HIGH TEMPERATURE STRAIN GAGES

(75) Inventors: Otto J. Gregory, Wakefield, RI (US);
Tao You, Kingston, RI (US)

(73) Assignee: Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 0 days.

(21) Appl. No.: 12/228,233

(22) Filed: Aug. 11, 2008

(65) Prior Publication Data

US 2009/0173162 A1 Jul. 9, 2009

Related U.S. Application Data

(63) Continuation of application No. 10/972,013, filed on Oct. 22, 2004, now abandoned.

(60) Provisional application No. 60/513,854, filed on Oct. 23, 2003.

(51) Int. Cl.
*G01L 1/00* (2006.01)
(52) U.S. Cl. ......................................................... 73/777
(58) Field of Classification Search ....................... 73/777
See application file for complete search history.

(56) References Cited

U.S. PATENT DOCUMENTS

| | | | |
|---|---|---|---|
| 3,805,601 A * | 4/1974 | Jeffers | 73/777 |
| 5,141,330 A * | 8/1992 | Gregory et al. | 374/32 |
| 5,163,220 A * | 11/1992 | Zeto et al. | 29/846 |
| 5,251,981 A * | 10/1993 | Kreider | 374/179 |
| 5,338,566 A * | 8/1994 | Gregory et al. | 427/8 |
| 5,375,474 A * | 12/1994 | Moore, Sr. | 73/766 |
| 5,627,637 A | 5/1997 | Kapteyn | |
| 5,780,727 A * | 7/1998 | Gimzewski et al. | 73/105 |
| 5,861,558 A | 1/1999 | Buhl et al. | |
| 5,915,285 A * | 6/1999 | Sommer | 73/865.7 |
| 6,427,539 B1 | 8/2002 | Chen et al. | |
| 6,429,417 B1 * | 8/2002 | Street et al. | 250/214.1 |
| 6,521,966 B1 | 2/2003 | Ishio et al. | |
| 6,584,857 B1 * | 7/2003 | Furlani et al. | 73/800 |

(Continued)

FOREIGN PATENT DOCUMENTS

WO WO02/23517 * 5/2002

OTHER PUBLICATIONS

Dyer et al, "Preparation and piezoresistive properties of reactively sputtered indium tin oxide thin films", Thin Solid Films 288, 1996, pp. 279-286.

(Continued)

*Primary Examiner* — Freddie Kirkland, III
(74) *Attorney, Agent, or Firm* — Gauthier & Connora LLP

(57) ABSTRACT

A ceramic strain gage based on reactively sputtered indium-tin-oxide (ITO) thin films is used to monitor the structural integrity of components employed in aerospace propulsion systems operating at temperatures in excess of 1500° C. A scanning electron microscopy (SEM) of the thick ITO sensors reveals a partially sintered microstructure comprising a contiguous network of submicron ITO particles with well defined necks and isolated nanoporosity. Densification of the ITO particles was retarded during high temperature exposure with nitrogen thus stabilizing the nanoporosity. ITO strain sensors were prepared by reactive sputtering in various nitrogen/oxygen/argon partial pressures to incorporate more nitrogen into the films. Under these conditions, sintering and densification of the ITO particles containing these nitrogen rich grain boundaries was retarded and a contiguous network of nano-sized ITO particles was established.

16 Claims, 8 Drawing Sheets

U.S. PATENT DOCUMENTS 6,729,187 B1 * 5/2004 Gregory .................... 73/760
2005/0115329 A1 * 6/2005 Gregory et al. ................ 73/777

OTHER PUBLICATIONS

Gregory et al, "An apparent n to p transition in reactively sputtered indium-tin-oxide high temperature strain gages", Thin Solid Films 405, 2002, pp. 263-269.

Gregory et al, "High temperature stability of indium tin oxide thin films", Thin Solid Films 406, 2002, pp. 286-293.

Gregory et al, "A self-compensated ceramic strain gage for use at elevated temperatures", Sensors and Actuators A 88, 2001, pp. 234-240.

NASA Aerospace Propulsion and Power Program NRA-01-GRC-02 Ceramic Strain Gages for Use at Temperatres up to 1500C Annual Technical Report, Dec. 2001-Oct. 2002, pp. 1-25.

Cahill et al., "Thermometry and Thermal Transport in Micro-Nanoscale Solid-State Devices and Structures", Journal of Heat Transfer, Apr. 2002, vol. 124, pp. 223-241.

Cahill et al., "Nanoscale thermal transport", Journal of Applied Physics, Jan. 15, 2003, vol. 93, No. 2, pp. 793-818.

* cited by examiner

US 7,963,171 B2

HIGH TEMPERATURE STRAIN GAGES

PRIORITY INFORMATION

This application is a continuation of U.S. patent application Ser. No. 10/972,013, filed on Oct. 22, 2004 now abandoned and claims priority to U.S. Provisional Patent Application 60/513,854, filed on Oct. 23, 2003, all of which are incorporated herein by reference in their entirety.

GOVERNMENT SPONSORSHIP

This invention was made with government support under Grant No. NRA-01-GRC-02 awarded by NASA. The government retains certain rights in the invention.

BACKGROUND OF THE INVENTION

1. Field of the Invention

This invention relates generally to a high temperature ceramic strain gage. The gage is produced from indium-tin-oxide and can function at temperatures in excess of 1500° C.

2. Description of the Prior Art

The accurate measurement of both static and dynamic strain, at elevated temperatures is frequently required to determine the instabilities and life-times of various structural systems, and in particular, advanced aerospace propulsion systems. Conventional strain gages are typically applied to both stationary and rotating components for this purpose but are usually limited in scope due to their intrusive nature, severe temperature limitations and difficulties in bonding.

Thin film strain sensors are particularly attractive in the gas turbine engine environment since they do not adversely effect the gas flow over the surface of a component and do not require adhesive or cements for bonding purposes. Typically, thin film strain gages are deposited directly onto the surface of a component nickel based superalloy or other high temperature substrate by rf sputtering or other known thin film deposition technology and as a result are in direct communication with the surface being deformed. In general, the piezo-resistive response or gage factor (g), of a strain gage is the finite resistance change of the sensing element when subjected to a strain and can result from (a) changes in dimension of the active strain element and/or (b) changes in the resistivity (p) of the active strain element. Further, the active strain elements used in a high temperature static strain gage, must exhibit a relatively low temperature co-efficient of resistance (TCR) and drift rate (DR) so that the thermally induced apparent strain is negligible compared to the actual mechanical applied strain.

One material of choice for high temperature thin film strain gages is a wide band semiconductor, e.g. indium-tin oxide (ITO), due to its excellent electrical and chemical stability and its relatively large gage factor at high temperature. When used alone is usually limited by relatively high TCRs as is the case for many intrinsic semiconductors. However, as disclosed herein the TCR of a self-compensated ITO strain sensor can be reduced using a metal, e.g. Pt as a thin film resistor placed in series with the active ITO strain element.

Aerospace propulsion systems operate at temperatures in excess of 1500° C. Thin film strain gages are used to monitor the structural integrity of components employed in these systems. The high temperature stability and piezoresistive properties depend to a large extent on the thickness of the strain elements.

As the operating temperature of gas turbine engines is increased and new materials are developed to meet these new challenges, there is a need to assess the structural behavior of components in these harsh environments, so that structural models can be validated and newly developed materials can be monitored during actual engine operation. Thin film sensors are ideally suited to make measurements of operational turbine conditions since they have negligible mass and thus, minimal impact on vibration patterns. The sensors are non-intrusive in that the gage thickness is considerably less than the gas phase boundary layer thickness and thus, the gas flow path through the engine will not be adversely affected by these sensors. Not only are these sensors ideally suited for in-situ strain measurement where high gas velocities are encountered, but these strain gages have excellent adhesion and similar thermal expansion coefficients to most oxides used for electrical isolation.

SUMMARY OF THE INVENTION

A device according to the invention includes a ceramic strain gage based on reactively sputtered indium-tin-oxide (ITO) thin films which is used to monitor the structural integrity of components employed in aerospace propulsion systems operating at temperatures in excess of 1500° C. The strain gage has a partially sintered microstructure comprising a contiguous network of submicron ITO particles with well defined necks and isolated nanoporosity.

One object of the present invention is to provide strain gage which can sustain temperature in excess of 1500° C.

Another object of the invention is to provide a strain gage having little signal draft.

Still another object of the invention is to provide a strain gage having a gage factor of about 0.00001%/hr at 1538° C.

Other features and advantages of the present invention will now be described in greater detail with reference to the accompanying drawings.

DETAILED DESCRIPTION OF PREFERRED EMBODIMENT

Figure 1:
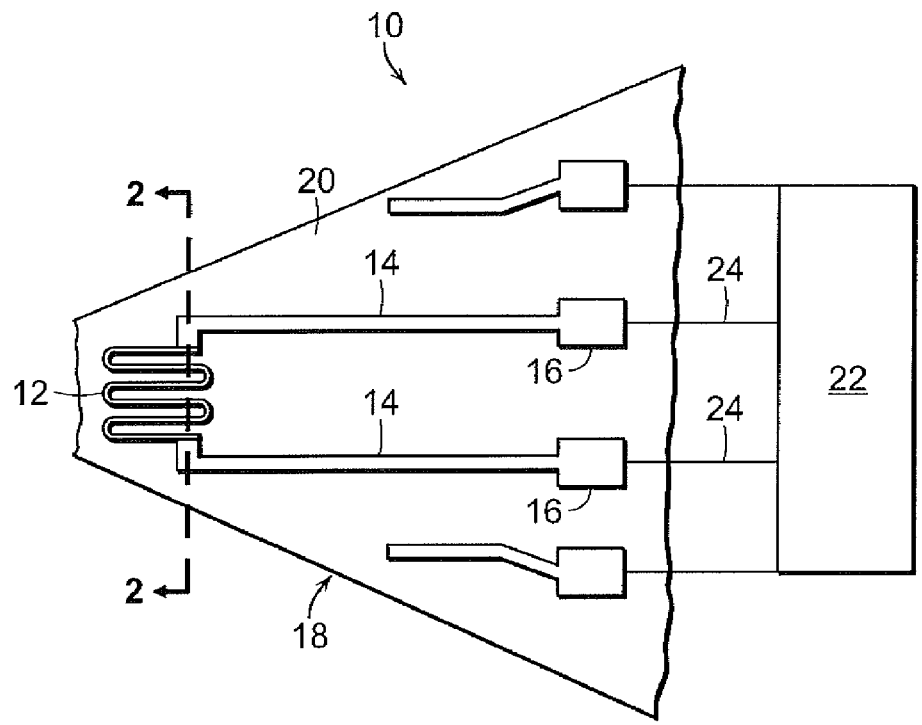
FIG. 1 is a top view of an alumina constant strain beam in accordance with the present invention.

ITO strain gages with controlled nanoporosity were prepared by subjecting relatively thick ITO films to a post deposition anneal at 800° C. in nitrogen and exposing the same to high temperature, or by reactive sputtering in various nitrogen/oxygen/argon partial pressures and exposing to high temperature. SEM indicated that although the microstructures of the nitrogen-sputtered films were similar in appearance to those produced by a post deposition anneal in nitrogen, the average pore size and particle size were an order of magnitude smaller for those sensors prepared by sputtering in nitrogen overpressures. It appears that nitrogen was metastably retained in the individual ITO grains during sputtering and diffused out of the bulk grains at elevated temperature, eventually becoming trapped at grain boundaries and triple junctions. Under these conditions, sintering and densification of the ITO particles containing these nitrogen rich grain boundaries was retarded and a contiguous network of nano-sized ITO particles was established. The controlled microstructures in these sensors are due to the decomposition of ITO in nitrogen bearing atmospheres can occur at temperatures as low as 1100° C. By controlling the partial pressure of nitrogen in the porosity during processing, a balance between the rate of decomposition and the sintering rate could be achieved so that the desired microstructure would persist for prolonged periods at elevated temperatures. Static strain testing of the nitrogen-sputtered ITO sensors indicated that a similarly stable and responsive strain gage could be readily reproduced. Microstructural evidence to support the hypothesis that partially sintered microstructures with controlled nanoporosity could be stabilized to very high temperatures is presented within as well as the results of static strain tests at temperatures up to 1600° C.

Ceramic sensors are refractory, non-intrusive and robust enough to withstand the high "g" loading associated with rotating components. For these reasons, ceramic strain gage based on alloys of (ITO) were developed to monitor both static and dynamic strain of components employed in advanced propulsion systems and active control surfaces.

One method of manufacturing a strain gage includes a substrate which is cleaned typically with acetone, deionized water and methanol, followed by nitrogen blow dry. The cleaned substrate is then pre-bake at a temperature of about 150° C. for approximately 45 mins. The substrate is then spincoated using LOR 10B at 500 rpm@15 s and 2000 rpm@45 s, softbaked at temperature about 140° C.@45 s and then spincoated again using SC1827 at 500 rpm@15 s and 200 rpm@45 s. The two spincoating steps form a coating of photoresist material. The substrate is then postbaked at a temperature of about 110° C.@150 s. A photomask is applied in a desired pattern to the top surface of the coated substrate Next the substrate is exposed to UV light for about 8.5 mins, and the photomask is removed before it is placed in AZ developer solution (Clariant, Charlotte N.C.) and developed until a clear pattern is seen. After exposure and development, the unwanted photoresist remaining on the alumina substrate was cleaned in an oxygen plasma to remove all organics. ITO and Platinum thin film are deposited by r.f. sputtering. After deposition, remover solution (Microposit remover 1165, Newington, N.H.) was used to finally clean the unexposed photoresist materials with coated thin films. ITO strain sensor was annealed in nitrogen environment at about 800° C. for 5 hours.

The active ITO strain elements in these ceramic sensors are oxidation resistant and do not undergo any phase changes when thermally cycled between room temperature and 1500° C. In addition, the piezoresistive response of ITO-based strain sensors is 1-2 orders of magnitude greater than those observed in metals and the ITO sensors have superior electrical and chemical stability relative to metals in these harsh environments. Consequently, improved signal to noise ratios are possible with these ceramic strain gages due to the inherently large piezoresistive responses. In operational turbine measurements, the enhanced sensitivity and responsiveness of the ceramic sensors are particularly important since the signals are usually processed via slip ring technology or telemetry systems, which are susceptible to excessive noise. A measure of the responsiveness or strain sensitivity of these ceramic sensors is given by the gage factor (G), which is defined according to equation (1) below:

$$G = \frac{\Delta R}{R_{ref}} * \frac{1}{\varepsilon} \qquad (1)$$

where $R_{ref}$ is the resistance at a reference temperature $T_{ref}$, $\Delta R$ is the change in resistance and $\varepsilon$ is the applied microstrain. However, also critical in these aerospace applications is the electrical and chemical stability of the sensors, which must operate at temperatures that can exceed 1500° C. The drift rate (DR) of these electrical strain gages is a measure of the stability and is defined according to equation (2) below:

$$DR = \frac{\Delta R}{R_{ref}} * \frac{1}{\Delta t_{time}} \qquad (2)$$

The influence of sensor thickness on the piezoresistive response and stability of indium-tin-oxide sensors was investigated. By systematically varying thickness of ITO strain gages prepared by rf sputtering and annealing in nitrogen at 800° C., a correlation between microstructure and high temperature properties is established. Very thick ITO active strain elements exhibit a partially sintered microstructure containing nano-sized ITO particles. The microstructure is largely responsible for the excellent high temperature properties exhibited by these materials.

High purity aluminum oxide constant strain beams were used for all high temperature static strain tests, since they provide excellent electrical isolation at high temperature. These constant strain beams were laser-cut into the desired shape from rectangular plates of 99.9% pure alumina (Coors Ceramics located in Golden, Colo.). Prior to deposition of indium-tin-oxide thin films onto the alumina constant beams, approximately 5 μm of high purity alumina was sputtered onto these surfaces and heat treated at 1000° C. in air. The sputtered alumina layer provided enhanced adhesion to the substrate while limiting impurity diffusion from the substrate to the deposited ITO thin films. All substrates were cleaned by rinsing in acetone, methanol and distilled water, followed by a nitrogen blow dry. Photolithography techniques were used in conjunction with lift-off to fabricate all thin film strain gages. Etching tends to cause hot corrosion of the sensors at high temperature due to residual chlorides on the surfaces of the coatings and thus, is avoided whenever possible.

All lithography processes employed a polyimide-based photoresist in conjunction with a modified lift-off process to transfer the desired sensor pattern. A polyimide photoresist (LOR10B obtained from Microchem Inc. located in Newton, Mass.) was applied to the constant strain beam by spin coating at a spin speed of 2000 rpm and subsequently baked at 150° C. for 1 min. High bake temperatures are required with this photoresist due to its high glass transition temperature. An imaging resist (SC1827 Shipley located in Marlborough, Mass.) was applied directly onto the LOR10B surface by spin-casting, followed by soft baking at 120° C. for 4 min. A photomask containing the desired artwork was placed over the resist-coat substrate and exposed to UV light. After exposure and development, the unwanted photoresist remaining on the alumina substrate was cleaned in an oxygen plasma to remove all organics. The ITO films were deposited by rf reactive sputtering using an MRC 822 sputtering system. A high density ITO target (12.7 cm in diameter) with a nominal composition of 90 wt % $In_2O_3$ and 10 wt % $SnO_2$ was used for all ITO depositions and a high purity (99.9999%) platinum target (10.7 cm in diameter) was used for all platinum depositions. The sputtering chamber was evacuated to a background pressure $<1\times10^{-6}$ torr prior to sputtering and argon, oxygen and nitrogen were leaked into the chamber. MKS mass flow controllers controlled the oxygen (semiconductor grade) flow rate at 0.5 cm$^3$/min and argon (semiconductor grade) flow rate at 9.0 cm$^3$/min in the deposition chamber to maintain the pressure of $3.5\times10^{-3}$ torr for the sputtering ITO sensors without nitrogen environment. To prepared ITO strain sensor with controlled nanoporosity in nitrogen rich environment, the oxygen, argon and nitrogen partial pressure were controlled by leaking these gases into the deposition chamber using MKS mass flow controllers to maintain oxygen (semiconductor grade) flow rate at 0.3 cm$^3$/min, nitrogen (semiconductor grade) flow rate at 0.5~2.5 cm$^3$/min and argon (semiconductor grade) flow rate at 9.0 cm$^3$/min and a total pressure of $5.5\times10^3$ torr. RF powers of 350 W and forward voltage of 1900V were used for all ITO sputtering runs (10 hours ITO sputtering for sensors prepared in argon/oxygen environment and 6 hours ITO sputtering for sensors prepared in argon, oxygen and nitrogen environment). Platinum films (3-4 µm thick), which are deposited by RF sputtering for 2 hours at an argon pressure of $3.3\times10^{-3}$ torr, RF power of 350 W and forward voltage of 2800V, were used to form ohmic contacts to the active ITO strain elements and thin film leads to make electrical connection to the data acquisition system. Before high temperature testing of ITO sensors, all ITO sensors are annealed in a sealed tube with a partial nitrogen environment, where ITO sensors are dwelled in 25° C. for 4 hours and heat treated at 800° C. for 5 hours. Nitrogen (industrial grade) flow rate was maintained at 70 cm$^3$/min by MKS 274C flow controller and passed through cold trap maintained at −40 C (Neslab located in Newington, N.H., RTE-100) before leaked into the sealed tube. During the testing process, ITO sensors were held at 1250° C. for 20 hours for the nanoporous structure to develop.

Figure 2:
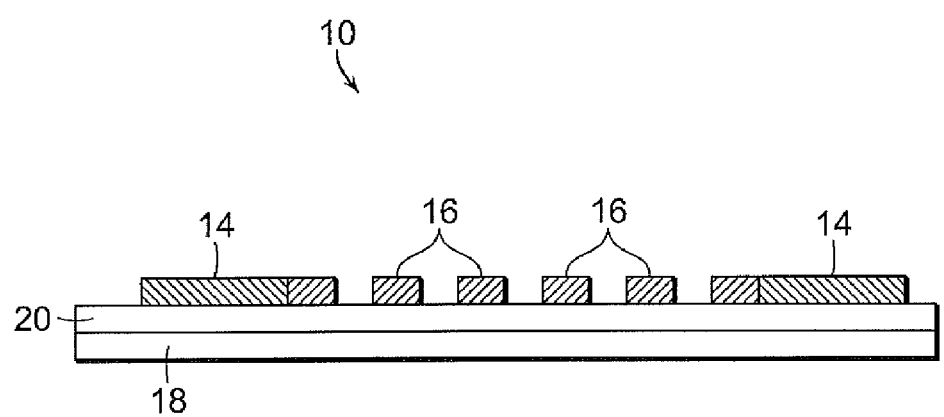
FIG. 2 is sectional view of the alumina constant strain beam taken along line 2-2 of FIG. 1.

A typical ceramic strain gage 10 complete with the active ITO strain elements 12 along with platinum leads 14 and bond pads 16 is shown in FIGS. 1 and 2. The sensor 10 including a substrate 18, such as alumina, and optionally an alumina layer 20 deposited onto a superalloy substrate. Strain element 12 such as an ITO film is deposited on alumina layer 20 or optionally directly on substrate 18. The strain element 12 is responsive to applied force. Strain element 12 is coupled to a data acquisition system 22 via leads 14 along lines 24. The leads may be platinum films. The strain element 12 has a controlled microstructure consisting of nanoporous ceramic created by the deposition of the strain element on the alumina layer 20 or optionally on the substrate 12 in a pre-determined atmosphere of nitrogen and oxygen. Alternatively, the controlled microporous structure of the strain element 12 is created by the annealing of the strain element 12 at a high temperature subsequent to the deposition thereof on the alumina layer 20 or optionally on the substrate 12.

A Deltech tube furnace with a 7-inch hot zone was used for high temperature strain experiments. The furnace was ramped at 3° C./min to the desired temperature in 50° C. increments and held for at least 1 hour to establish thermal equilibrium. Strain was induced by means of a cantilever-bending fixture fabricated from a machinable zirconium phosphate ceramic. A linear variable differential transducer (LVDT) was attached to a solid alumina rod, and connected to the alumina constant strain beam to transfer strain to the active sensor element. The corresponding resistance changes were monitored with a 6-digit multi-meter (Hewlett-Packard located in Loveland, Colo., 34401A) and a programmable constant current source, 224 available from Keithley located in Cleveland, Ohio. A Hewlett-Packard multimeter and Keithley constant current source were interfaced to an I/O board and an IBM 488 GPIB card for continuous data acquisition using Labwindows software. A type S thermocouple connected to a second multimeter was used to measure the temperature inside the Deltech furnace.

The semiconductors can be selected from the group consisting of silicon carbide, aluminum nitride, zinc oxide, gallium nitride, indium nitride, scandium nitride, titanium nitride, chromium nitride, zirconium nitride, boron carbide, diamond, titanium carbide, tantalum carbide, zirconium carbide, gallium phosphide, aluminum gallium nitride, zinc oxide doped with alumina, cadmium telleride, cadmium selenide, cadmium sulfide, mercury cadmium telleride, zinc selenide, zinc telleride, magnesium telleride, tin oxide, indium oxide, manganates-manganese oxides with iron oxides, iron oxide-zinc-chromium oxide, iron oxide-magnesium-chromium oxide, ruthenium oxide, lithium doped nickel oxide, tantalum nitride, indium-tin oxide-gallium oxide-tin oxide and combinations thereof.

The metal resistors can be selected from the group consisting of platinum, rhodium, palladium, gold, chromium, rhenium, iridium, tungsten, molybdenum, nickel, cobalt, aluminum, copper, tantalum, alloys of platinum and rhodium and combinations thereof.

A particularly preferred semi-conductor is indium tin oxide and a particularly preferred metal is platinum.

Figure 3A:
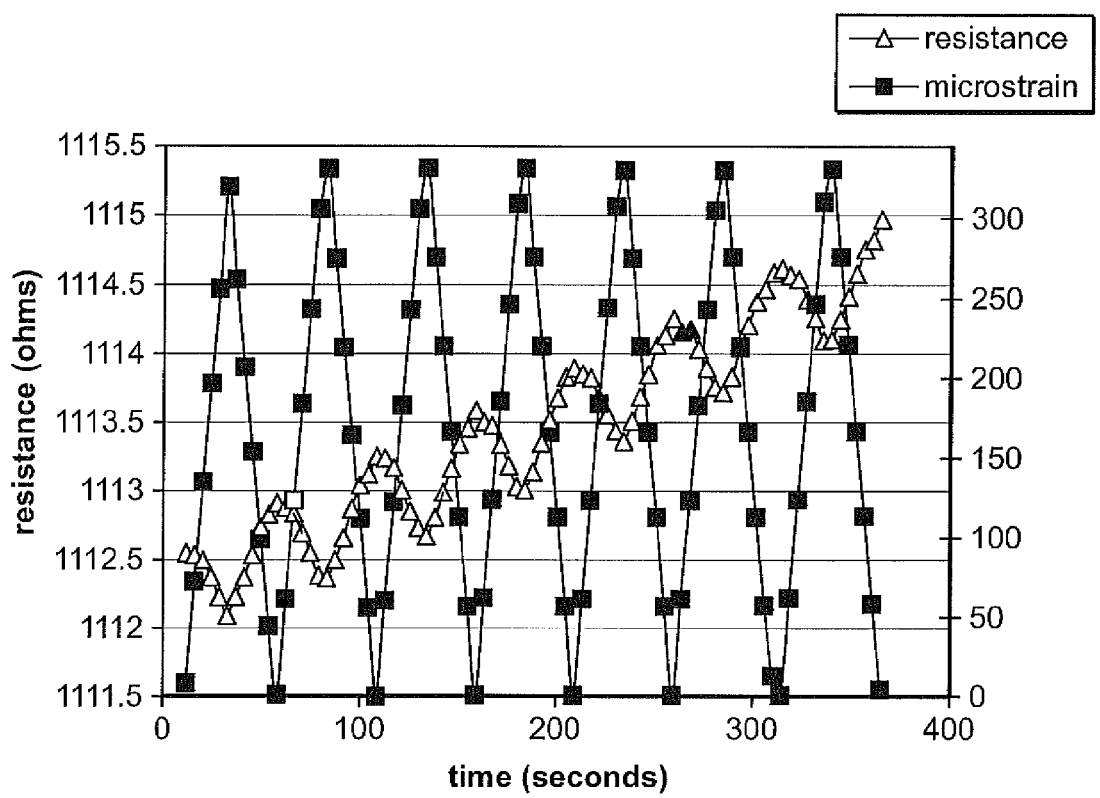
FIG. 3a is a graph of a piezoresistive response of a 2.5 μm thick ITO strain gage at 1157° C.
Figure 3B:
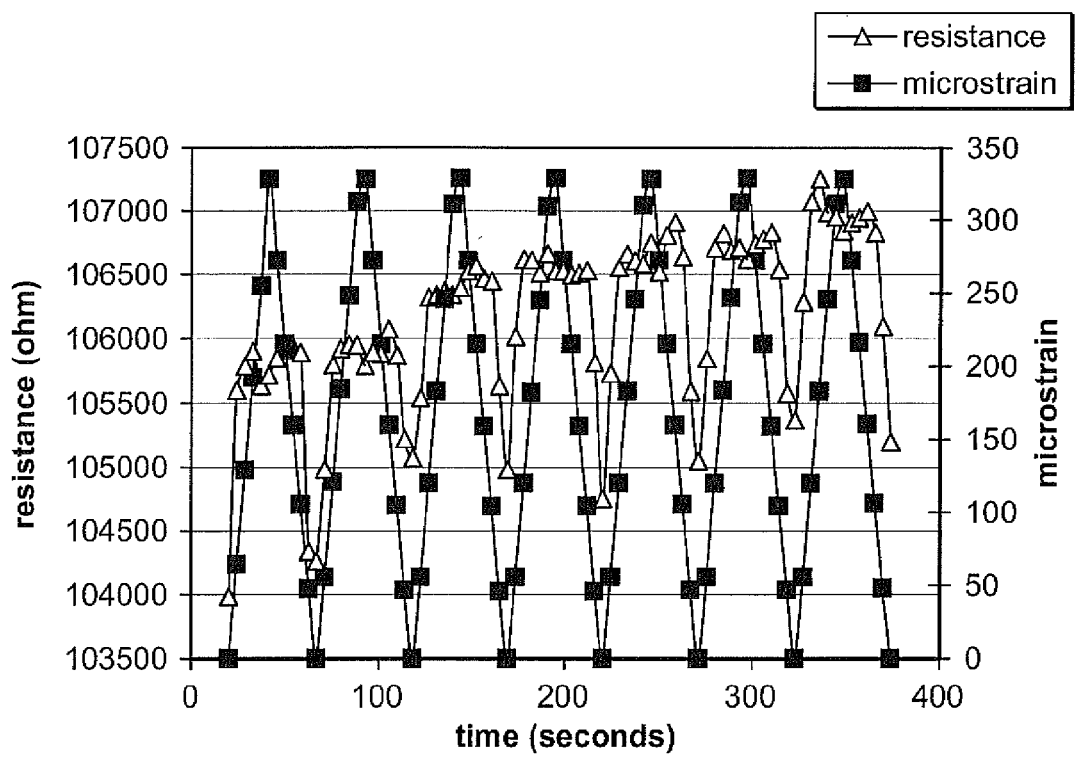
FIG. 3b is a graph of a piezoresistive response of a 2.5 μm thick ITO strain gage at 1225° C., just prior to failure.
Figure 4:
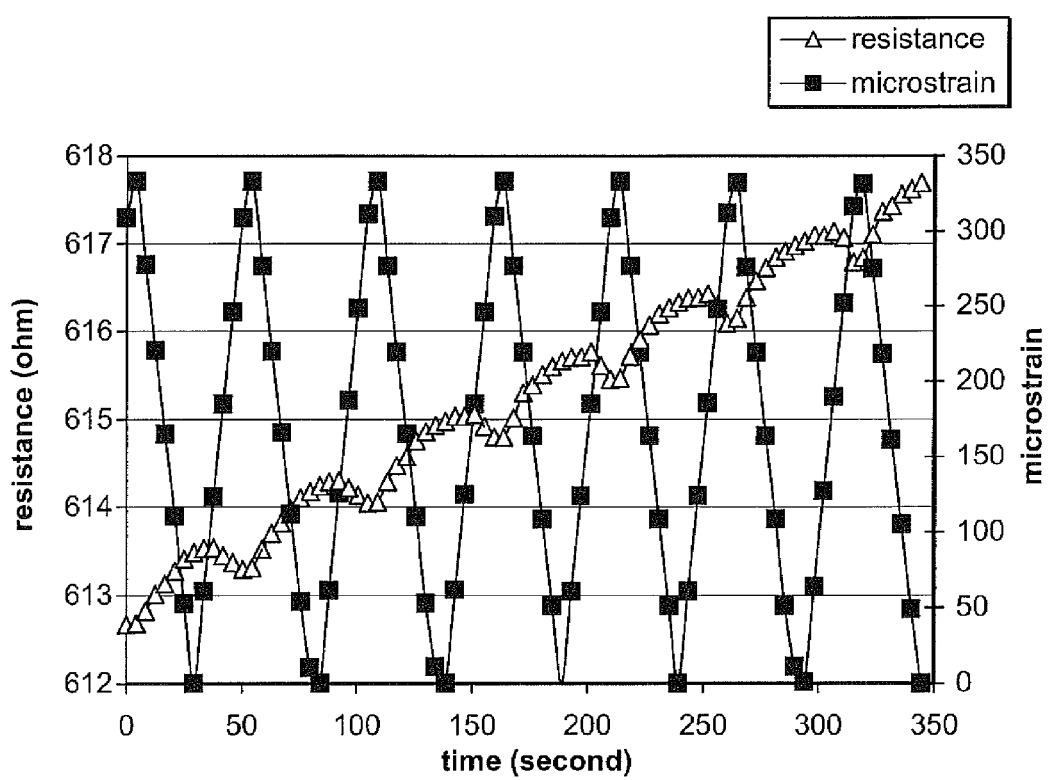
FIG. 4 is a graph of a piezoresistive response of a 5 μm thick ITO strain gage at 1438° C. just prior to failure.
Figure 5A:
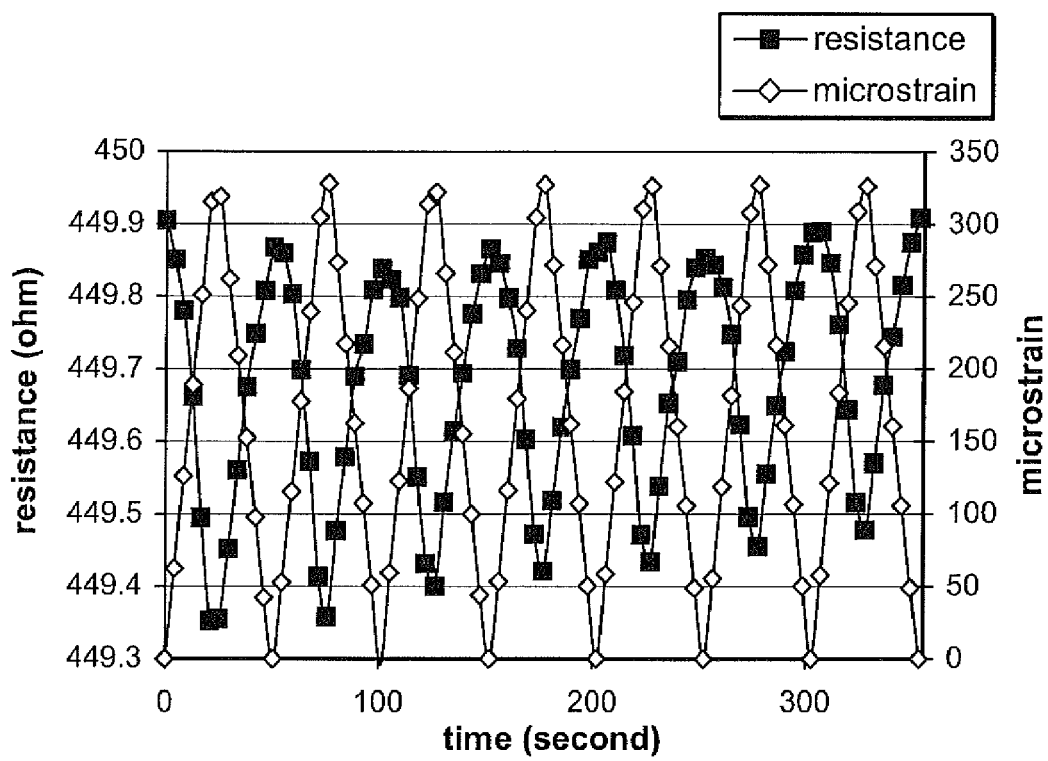
FIGS. 5a and 5b are graphs of piezoresistive response of an 8 μm thick ITO strain gage at 1441° C. and at 1481° C., just prior to failure, respectively.
Figure 5B:
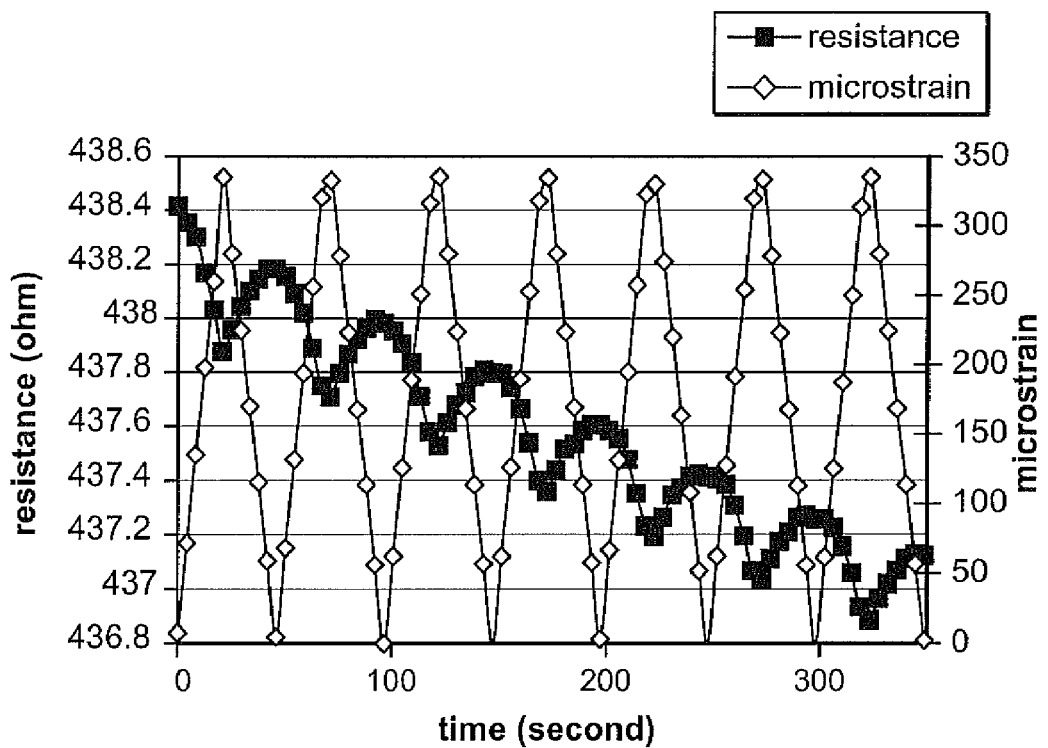

A number of ceramic strain gages having different ITO thicknesses comprising the active strain elements were deposited on high purity aluminum oxide constant strain beams and tested under static strain conditions at temperatures up to 1600° C. The piezoresistive response of a typical ceramic strain gage at 1157° C. is shown in FIG. 3a. This ceramic sensor had a 2.5 µm thick active ITO strain element and exhibited a relatively small piezoresistive response and a relatively large drift rate; i.e. a gage factor of 3.52 and a drift rate of 0.016%/hr at 1157° C. As illustrated, the piezoresistive response is out of phase with the excitation signal and the positive slope of the piezoresistive response is an indication of signal drift. These results were very different from those obtained when thick ITO films were employed as the active strain elements in these ceramic strain gages. When relatively thin ITO films were used, the piezoresistive response was comparable to metals at lower temperatures (1157° C.) as shown in FIG. 3a, but became unstable at temperatures above 1225° C., as shown in FIG. 3b in which the sensor was subjected to a post deposition heat treatment in nitrogen after sputtering. It should be noted here that the waveform associated with the piezoresistive response had severely degraded and the baseline resistance has increased by several orders of magnitude, which typically occurs just prior to failure. In contrast to this behavior, ITO sensors prepared with 5 μm thick active strain elements and 8 μm thick active strain elements were very stable and responsive at even higher temperatures. For example, ITO sensors prepared with 5 μm thick active strain element. The sensor was subjected to a post-deposition heat treatment in nitrogen after sputter and exhibited a gage factor of 6.8 and drift rate of 0.08%/hr at 1438° C. as shown in FIG. 4. The graphs in FIGS. 5a and 5b illustrate sensors prepared with 8 μm thick active strain elements and again were subjected to post-deposition heat treatment in nitrogen sputter. They exhibited a gage factor of 20.9 and a drift rate of 0.00001%/hr at 1441° C. The latter strain sensor did not become unstable until temperatures approached 1481° C. as shown in FIG. 5b. The piezoresistive response and electrical stability of the ceramic strain gages are dependent on the thickness of ITO films comprising the active strain elements. A summary of the results from the static strain tests are presented in Table 1, including the thickness dependence on stability, temperature at which sensor failure occurred and piezoresistive response.

TABLE 1

Piezoresistive responses and drift rates for various ITO sensors after post-deposition heat treatment in nitrogen and exposure.

| ITO thickness | Temperature ° C. | Gage factor | Drift rate %/hour | Failure Temperature ° C. |
|---|---|---|---|---|
| 2.5 μm | 1157 | 3.52 | 0.0160 | 1157 |
| 5 μm | 1438 | 6.8 | 0.0800 | 1438 |
| 8 μm | 1441 | 20.9 | 0.0001 | 1481 |
| 8 μm | 1481 | 13.79 | 0.0280 | 1481 |
| 10 μm | 1528 | 131 | 0.00001 | 1544 |
| 15 μm | 1446 | 24.9 | 0.00001 | 1450 |

Figure 6:
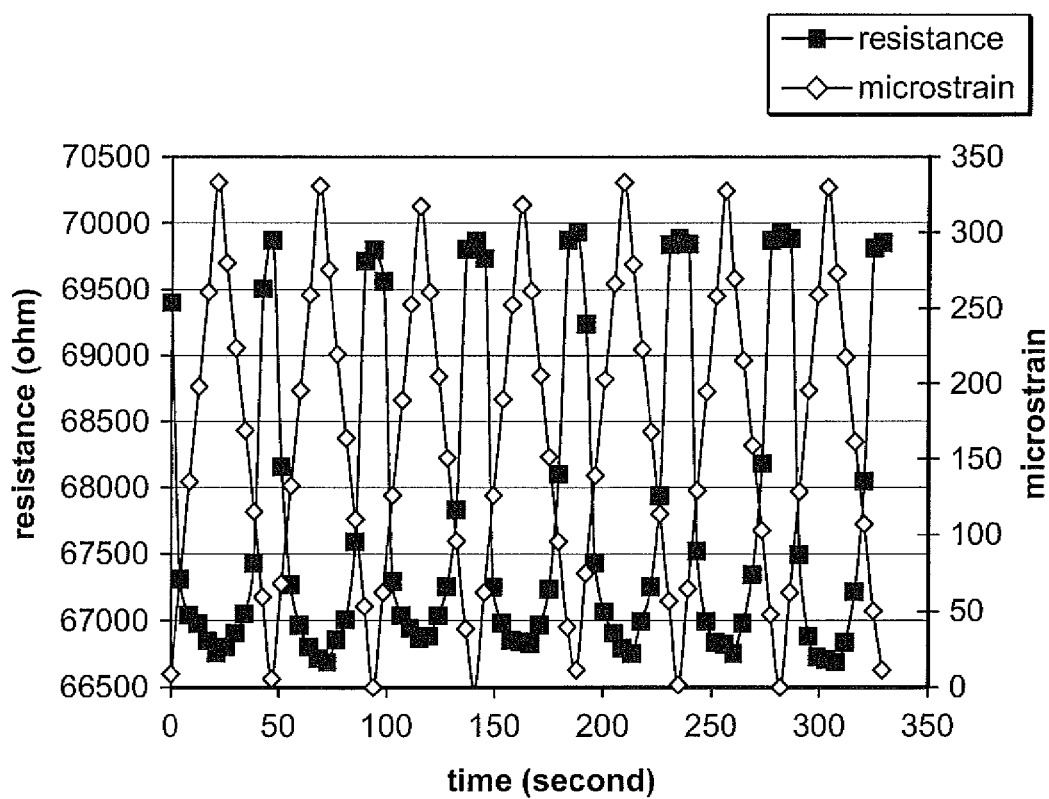
FIG. 6 is a graph of a piezoresistive response of a 10 μm thick ITO strain gage at 1528° C.
Figure 7:
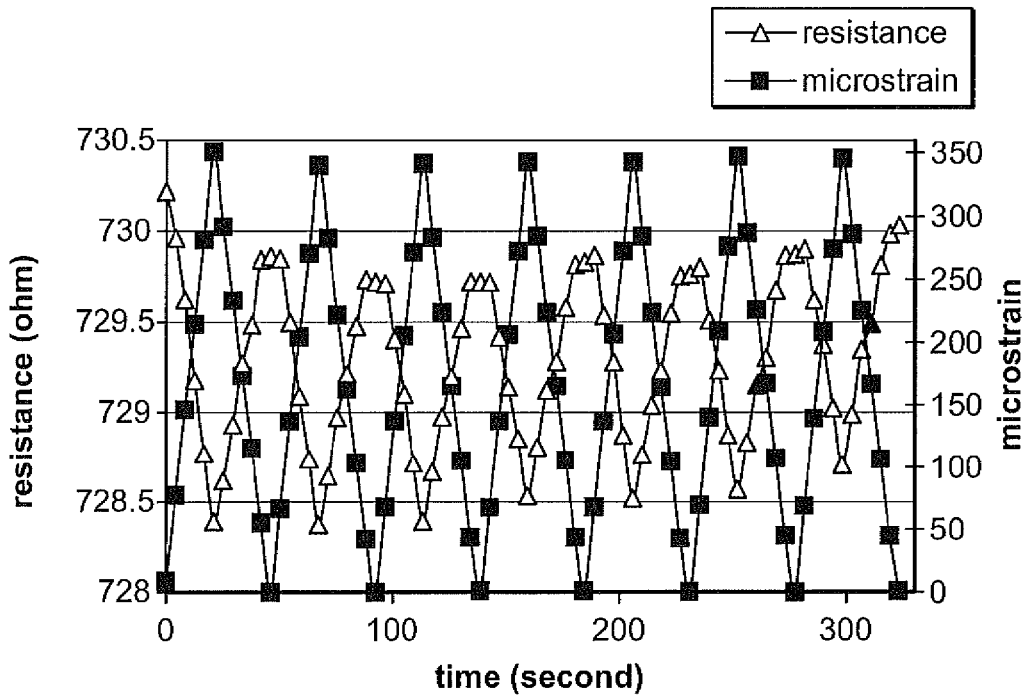
FIG. 7 is a graph of a piezoresistive response of a 15 μm thick ITO strain gage at 1446° C.

When ceramic strain gages were prepared with very thick ITO films (10-15 μm) as the active strain elements, both the high temperature stability and gage factor were significantly improved relative to ITO films prepared in the 2.5-8 μm thickness range. FIG. 6 shows the piezoresistive response of a ceramic strain gage employing a 10 μm thick film of ITO as active strain element. This sensor was extremely stable and responsive with a gage factor of 131 and a drift rate of 0.00001%/hr at 1528° C. Similarly, the piezoresistive response of a ceramic strain gage employing a 15 μm thick ITO film as active strain element is shown in FIG. 7. Here, an extremely stable and responsive strain gage was achieved with this 15 μm thick ITO sensor at 1446° C. An average gage factor and drift rate of 24.9 and 0.00001%/hr, respectively, were established over the course of several hours of strain testing. The high temperature piezoresistive properties of these thick ITO films are significantly better than those observed for ITO sensors prepared with very thin active strain elements. The only difference between the 10 μm and 15 μm thick strain ITO strain gages was the considerably lower baseline resistance associated with the 15 μm thick strain gages. This marked improvement in the piezoresistive response and stability associated with these very thick ITO gages lead us to believe that significant changes in the microstructure of the ITO films had occurred either as a result of processing the films or post-deposition heat treatment.

Figure 8:
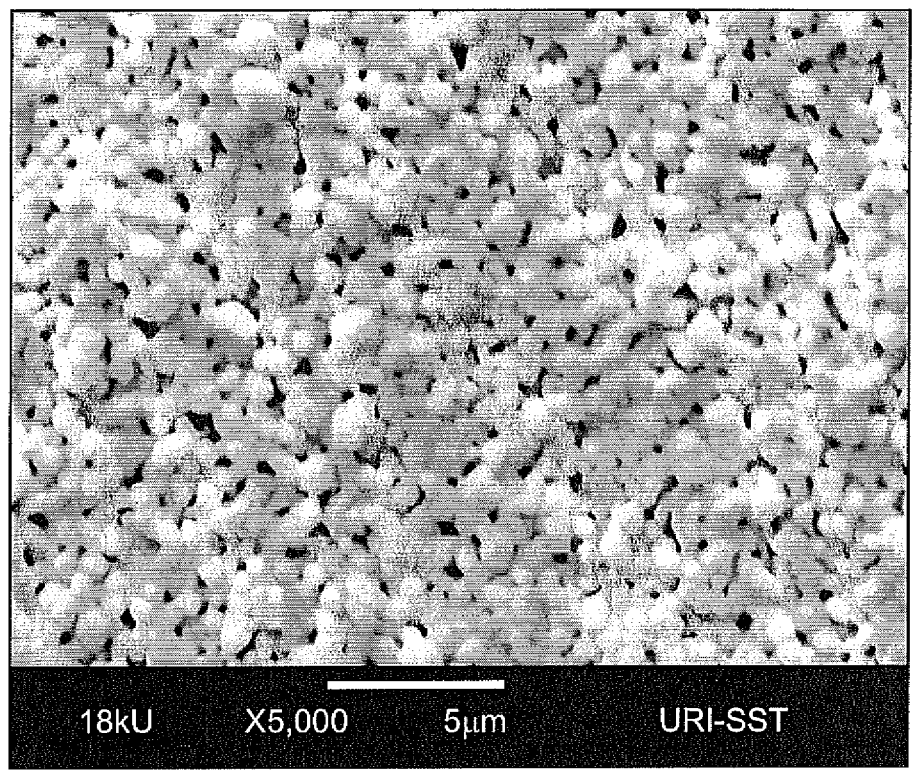
FIG. 8 is a SEM micrograph of a 10 μm thick ITO strain element after post-deposition heat treatment in nitrogen and testing at 1528° C.
Figure 9:
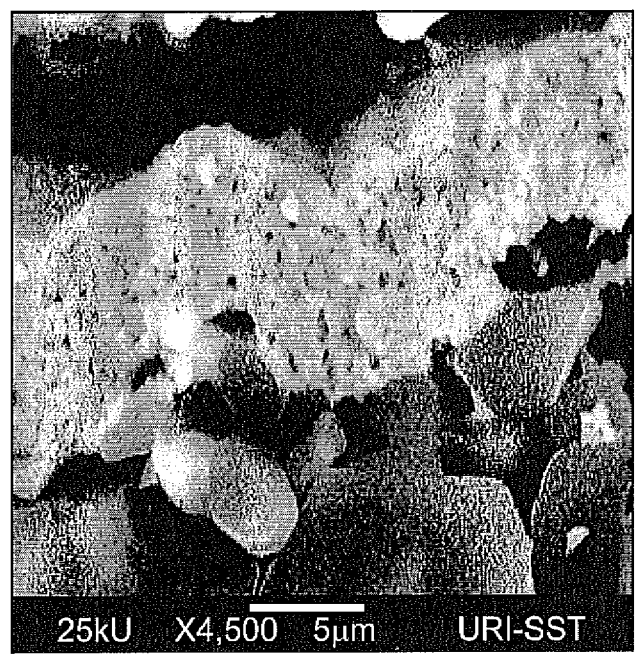
FIG. 9 is a SEM micrograph of a cross section of a 10 μm thick ITO strain element after post-deposition heat treatment in nitrogen and 1500° C. exposure.
Figure 10:
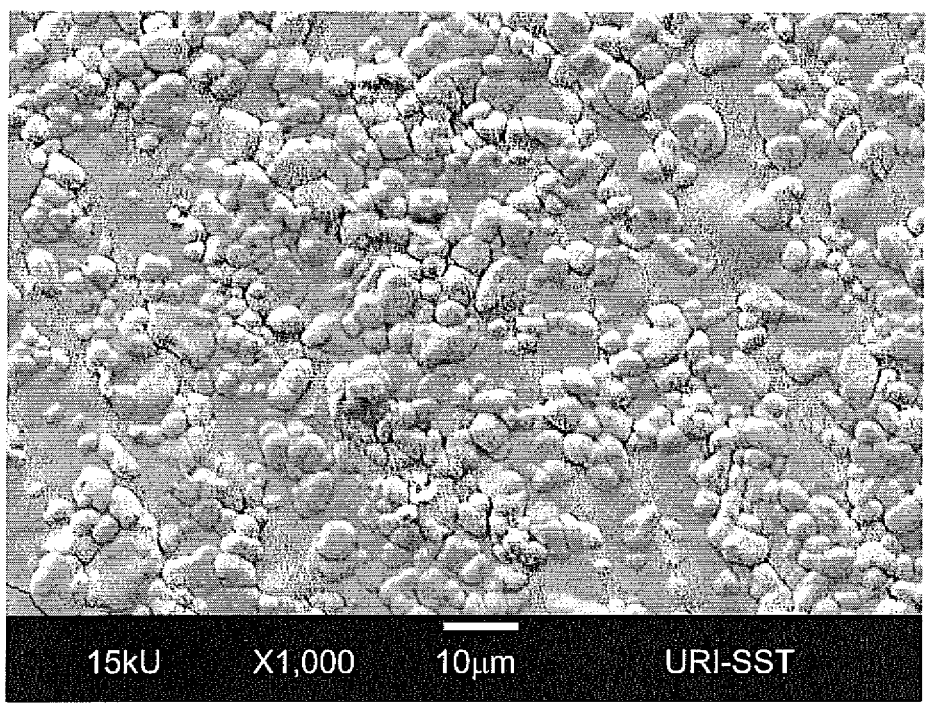
FIG. 10 is a SEM micrograph of an as-deposited and annealed ITO strain gage having a 10 μm thickness.

Initially, the extremely stable and responsive ITO strain sensors were prepared by sputtering very thick ITO films in oxygen:argon atmospheres and subsequently annealing them in nitrogen at 800° C. As suspected, a marked change in microstructure had occurred in the thick ITO strain gages relative to the thin ITO strain gages prepared in this manner. The ITO sensors were examined prior to and after strain testing by scanning electron microscopy (SEM). An SEM micrographs as seen in FIG. 8, of a thick ITO sensor (10 μm) subjected to a post-deposition heat treatment in nitrogen showed that a porous network with considerable surface roughness had developed after high temperature exposure. Examination at higher magnifications of the same surface indicated that the microstructure comprised an aggregate of partially sintered particles; i.e. a contiguous network of nano-sized ITO particles with well defined necks and isolated nanopores. A fracture surface of a thick ITO sensor subjected to a post-deposition heat treatment in nitrogen and heated to 1530° C. is shown in FIG. 9. This cross sectional view of the sensor at low magnification revealed that the interior regions of the thick ITO film contained a large number of isolated nanopores while the surface layers comprised a higher density, coarser grain material where appreciable sintering and densification had occurred. Similar microstructures had been reported during the rapid heating and sintering of nanocrystalline ITO ceramic particles. It was previously believed that once a densified outer region had formed, the interior regions of the powder compact were not able to densify because the outer layer constrains the densification geometrically. However, it has been determined that the densified or sintered outer layer of the ITO film prevented oxygen from diffusing into the bulk film, which further stabilized the ITO at elevated temperature. When the as-deposited and nitrogen-annealed ITO film as seen in FIG. 10 is compared to the same film after high temperature exposure as seen in FIG. 8, it is evident that the nanoporous microstructure had developed after high temperature exposure; i.e. the microstructure was developed after the temperature exceeded 1500° C.

Figure 11:
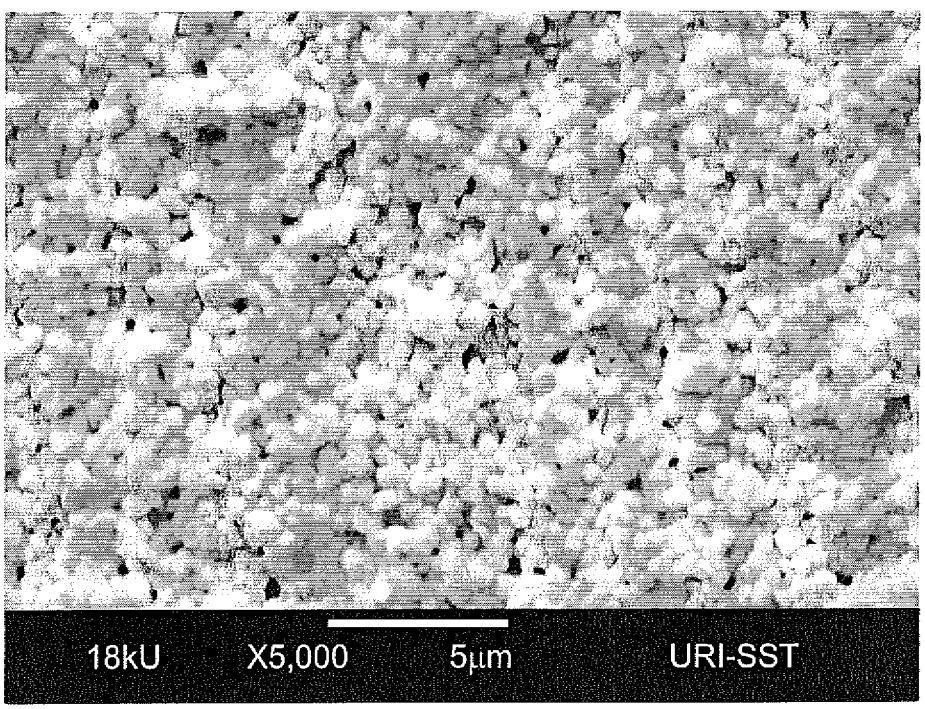
FIG. 11 is a SEM micrograph of a 6 μm ITO strain element prepared by sputtering in a nitrogen rich atmosphere, heat treated in nitrogen and tested at 1550° C.

In an attempt to metastably retain more nitrogen into the ITO films, a series of ITO films were sputtered in nitrogen overpressures using different argon/oxygen/nitrogen partial pressures. Not only did this process permit the incorporation of more nitrogen into the film but also the production of similar microstructures in more controllable manner. The SEM micrograph in FIG. 11 illustrates that by sputtering in a nitrogen-rich atmosphere a similar microstructure could be produced; i.e. a microstructure similar to those associated with the thick ITO films subjected to a post-deposition heat treatment (FIG. 8). However, even though the same partially sintered microstructure with extensive neck formation is shown in FIG. 11, the average ITO particle size was considerably smaller and the ITO particles had a more angular and faceted morphology. In the case of the nitrogen sputtered ITO films, it appears that nitrogen was metastably retained in the individual ITO grains during sputtering and diffused out of the bulk grains at elevated temperature, eventually becoming trapped at grain boundaries and triple junctions. Under these conditions, sintering and densification of the ITO particles containing these nitrogen rich grain boundaries was further retarded and a contiguous network of nano-sized ITO particles was established. In either case, the controlled microstructures developed in these sensors were achieved by controlling the partial pressure of nitrogen in the interconnected porosity during processing, such that a balance between the rate of decomposition and the sintering rate was maintained so that the desired microstructure would persist for prolonged periods at elevated temperatures. Since the decomposition of ITO alloys in pure nitrogen can occur at temperatures as low as 1100° C., the decomposition kinetics at higher temperatures can be controlled to a large extent by the nitrogen partial pressure maintained in the internal porosity.

Figure 12:
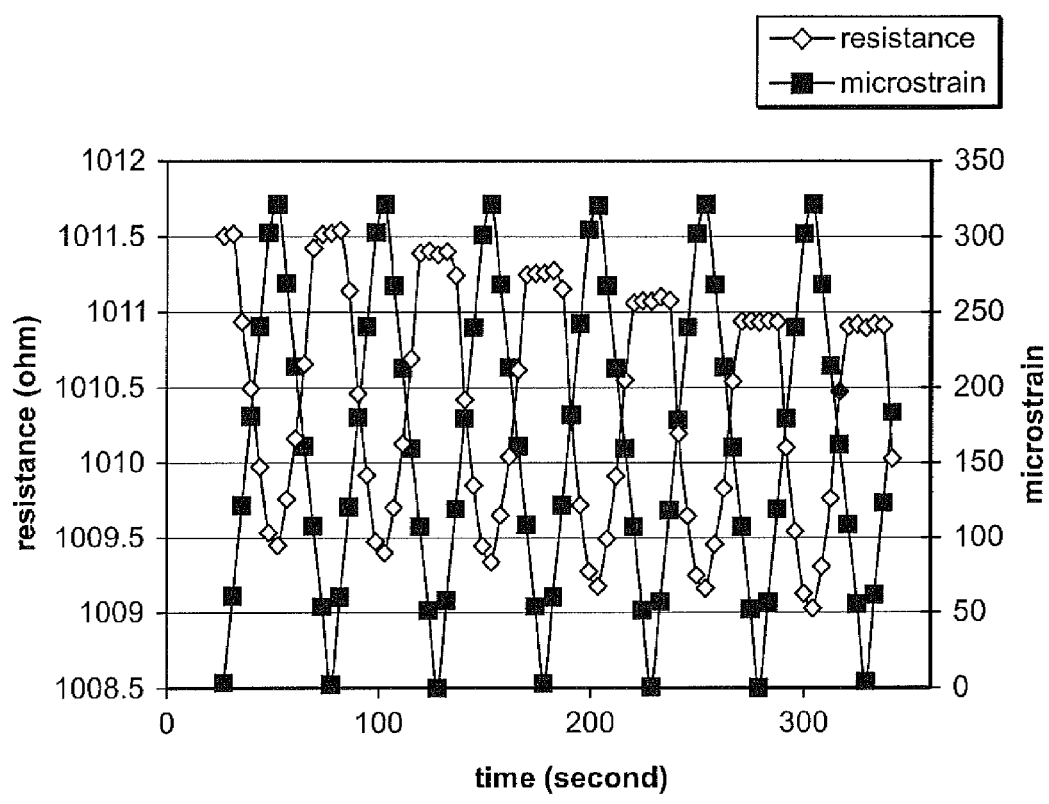
FIG. 12 is a graph of piezoresistive response of a 6 μm thick ITO strain gage at 1553° C.

Static strain testing further illustrates that sensors prepared with microstructures containing isolated nanopores had improved stability and piezoresistive responses compared to ITO strain gages with a typical densified microstructure. The piezoresistive response of a ceramic strain gage prepared with only 6 µm of a nitrogen-sputtered ITO film of FIG. 12 demonstrates the critical role that nitrogen plays in producing these stable nanoporous microstructures. This ITO thin film sensor was prepared in a nitrogen rich atmosphere and survived tens of hours of strain testing at 1553° C. with a gage factor of 11.4 and a drift rate of 0.0001%/hr. These results were significantly better than those obtained from thicker ceramic strain gages prepared in argon/oxygen ambients. For example, the piezoresistive response of an 8 µm thick ITO sensor at 1441° C., was reasonably good but became unstable at temperature beyond 1481° C. Thin nitrogen-sputtered films, however, were stable at temperatures of 1562° C. and exhibited a reasonably large piezoresistive response and low drift rate (0.0001%/hr) at this temperature. When the thin nitrogen sputtered films were compared to thick ITO sensors, the same excellent electrical stability was observed as indicated by the very low drift rates. Both types of nanoporous ITO films proved to be effective oxygen diffusion barriers and slowed the migration of oxygen into the bulk film. This increased the stability of the ITO films, since the diffusion of oxygen through the non-stoichiometric indium-tin-oxide can lead to compensation of the doubly charged oxygen vacancies that are responsible for conduction in these materials. Since the higher density surface layers of the thicker ITO films make oxygen diffusion more difficult, the conductivity of the active sensor elements was much less affected by compensation and the electrical stability was significantly improved.

The sensors produced according to the invention described herein survive tens of hours of testing in air with little signal drift and gage factors between 3.5 and 180. Additionally drift rate between 0.1% and 0.00001%/hr were measured.

ITO thin film strain gages prepared with controlled nanoporosity were demonstrated at temperatures approaching 1600° C. High temperature static strain tests indicated that the piezoresistive response and electrical stability of these ceramic strain sensors depended on the thickness of ITO films comprising the active strain elements. When thick ITO gages were heat treated in nitrogen ambients, a partially sintered microstructure comprising a contiguous network of submicron ITO particles with well defined necks and isolated nanoporosity was established. Densification of the ITO particles was retarded during high temperature exposure with nitrogen playing a key role in stabilizing the nanoporosity. ITO strain sensors were also sputtered in various nitrogen partial pressures and annealed, to produce sensors with similar characteristics. SEM confirmed that similar microstructures with controlled nano-porosity could be prepared by this method as well but the average particle size was reduced by an order of magnitude. The electrical properties of relatively thin nitrogen-sputtered films were superior to those that were prepared from much thicker, annealed ITO films in terms of baseline resistivity, stability and piezoresistive response. Static strain testing indicated that the ITO thin film strain gages prepared with controlled nanoporosity survived repeated cyclic loading at temperatures as high as 1581° C. for tens of hours. The microstructure of these ITO sensors comprised a sintered or densified outer surface that protected the interior regions of the sensors from oxygen exposure. The detailed mechanism for stabilizing the ITO films to these high temperatures is not completely understood at this time and will require further investigation. However, there are considerable implications here for other types of ceramic gas sensors where microstructures with controlled nanoporosity are desired.

It will be apparent to those skilled in the art that the present invention may be embodied in may other specific forms without departing from the spirit or scope of the invention. Therefore, the present embodiment is to be considered as illustrative and not restrictive and the invention is not to be limited to the details given herein, but may be modified within the scope of the appended claims.

What is claimed is:

1. A high temperature ceramic strain gage, said strain gage comprising:
   a substrate;
   an indium-tin-oxide strain element positioned on the substrate; and
   a data acquisition system coupled to the substrate via leads and pads such that the strain gage is suitable for use in monitoring systems operating in excess of 1500° C., and wherein the strain gage has a drift rate of about 0.00001%/hr at 1528° C.

2. The strain gage of claim 1, wherein the lead lines and pads are platinum.

3. The strain gage of claim 1, wherein a layer of alumina is deposited on the substrate.

4. The strain gage of claim 1, wherein said strain gage has a partially sintered microstructure comprising a contiguous network of submicron indium-tin-oxide particles.

5. The strain gage of claim 1, wherein the strain gage has a gage factor of 131.

6. A high temperature ceramic strain gage, said strain gage comprising:
   a substrate;
   an indium-tin-oxide strain element positioned on the substrate; and
   a data acquisition system coupled to the substrate via leads and pads such that the strain gage is suitable for use in monitoring systems operating in excess of 1500° C., and wherein the strain gage has a gage factor of 131.

7. The strain gage of claim 6, wherein the strain gage has a drift rate of about 0.00001%/hr at 1528° C.

8. The strain gage of claim 6, wherein the lead lines and pads are platinum.

9. The strain gage of claim 6, wherein a layer of alumina is deposited on the substrate.

10. The strain gage of claim 6, wherein said strain gage has a partially sintered microstructure comprising a contiguous network of submicron indium-tin-oxide particles.

11. A high temperature ceramic strain gage, said strain gage comprising:
    a substrate;
    an indium-tin-oxide strain element positioned on the substrate; and
    a data acquisition system coupled to the substrate via leads and pads such that the strain gage is suitable for use in monitoring systems operating in excess of 1500° C., and wherein the strain gage has a fail threshold temperature of at least about 1544° C.

12. The strain gage of claim 11, wherein the strain gage has a drift rate of about 0.00001%/hr at 1528° C.

13. The strain gage of claim 11, wherein the strain gage has a gage factor of 131.

14. The strain gage of claim 11, wherein the lead lines and pads are platinum.

15. The strain gage of claim 11, wherein a layer of alumina is deposited on the substrate.

16. The strain gage of claim 11, wherein said strain gage has a partially sintered microstructure comprising a contiguous network of submicron indium-tin-oxide particles.

* * * * *